United States Patent Office 3,037,985
Patented June 5, 1962

3,037,985
PROCESS FOR THE PRODUCTION OF AMINE BORANES
Konrad Lang and Friedrich Schubert, Leverkusen, Germany, assignors to Farbenfabriken Bayer Aktiengesellschaft, Leverkusen, Germany, a corporation of Germany
No Drawing. Filed July 14, 1959, Ser. No. 826,920
Claims priority, application Germany July 19, 1958
10 Claims. (Cl. 260—290)

The present invention relates to a new and improved process of producing amine boranes. Amine boranes can be used as reducing agents, stabilizers preventing discoloration, starting substances for the manufacture of diborane, and additives to fuels.

Amine boranes are compounds of boronhydride and nitrogen, compounds of the composition $R_3N.BH_3$, wherein the symbol $R_3N$ means a compound of the class consisting of primary, secondary and tertiary aliphatic, cycloaliphatic and aromatic amines and heterocyclic nitrogen bases.

In accordance with the present invention it has been found that amine boranes can be obtained by reacting one of the aforesaid amines with at least one borohydride of the class consisting of alkali metal and alkaline-earth metal borohydrides and at least one boron trihalide or an addition product of a boron trihalide and an ether selected from the group consisting of aliphatic and cycloaliphatic ethers.

The process of the invention producing amine boranes proceeds according to the following equations:

$$4nR_4N + nBX_3 + 3Me(BH_4)_n \rightarrow 4nR_3N.BH_3 + 3MeX_n$$

wherein:

Me=Li($n=1$); Ca, Mg, Sr, Ba ($n=2$) and X=F, Cl, Br, I;
Me=Na, K ($n=1$) and X=Cl, Br, I respectively $$4R_3N + 4BF_3 + 3MeBH_4 \rightarrow 4R_3N.BH_3 + 3MeBF_4$$

Me=K, Na

Examples of amines which may be used in the process of the invention are methyl amine, dimethyl amine, trimethylamine, diethylamine, triethylamine, butylamine, dibutylamine, n-tributylamine, ethylenediamine, N,N,N′,N′ - tetramethylethylenediamine, tetramethylenediamine, dimethylcyclohexylamine, aniline, N-methylaniline, N,N-dimethylaniline, piperidine, pyridine.

Especially suitable boron halides are boron trifluoride and boron trichloride, but boron tribromide and boron iodide may also be used. Instead of free boron halides there may be used addition products of boron halides and ethers. Examples of such addition products are boron trifluoride dimethyletherate, $BF_3.O(CH_3)_2$, boron trifluoride diethyl etherate, $BF_3.O(C_2H_5)_2$, and boron trifluoride tetrahydrofuranate, $BF_3.OC_4H_8$.

The reaction can be carried out in solvents, e.g. diethylether, tetrahydrofurane or diethylene glycol dimethylether. However, the use of solvents can frequently be dispensed with, since most amines useful in the herein described process are liquid.

The reaction between the amine, boron halide and borohydride already sets in at room temperature, but completion of reaction sometimes requires an increase in temperature. It has to be observed that the stability of amine boranes increases as the number of hydrogen atoms on the nitrogen group decreases. N-trialkylamine boranes are generally stable to heating at high temperatures up to above 100° C., pyridine borane $C_5H_5N.BH_3$ can also be heated up to 100° C. without any disadvantage.

The process of the invention is further illustrated in the following examples without being restricted thereto.

Example 1

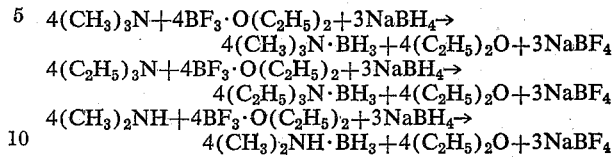

4 mols of boron trifluoride-diethyletherate are slowly added dropwise to a vigorously stirred suspension of 1.5 mols of sodium borohydride in a solution of 2 mols of amine (for example diethylamine, triethylamine or dimethylamine) in 1 litre of tetrahydrofuran. After the main reaction has taken place, the mixture is boiled for some hours under reflux. It is then filtered, the precipitate being washed with tetrahydrofuran, and by driving off the solvent from the combined filtrates, the amine borane formed is obtained in a substantially quantitative conversion and can be further purified by distillation or recrystallization.

Example 2

$CH_2.N(CH_3)_2$
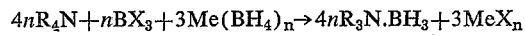
$2CH_2.N(CH_3)_2 + 4BF_3.O(C_2H_5)_2 + 3NaBH_4 \longrightarrow$ $CH_2—N(CH_3)_2.BH_3$
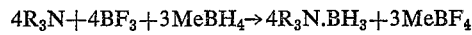
$2CH_2—N(CH_3)_2.BH_3 + 4(C_2H_5)_2O + 3NaBF_4$ 84 g. (2.2 mols) of sodium borohydride are suspended in a solution of 150 g. (1.29 mols) of anhydrous N,N′-tetramethylethylene diamine $$(CH_3)_2N.CH_2.CH_2.N(CH_3)_2$$

in 1.5 l. of tetrahydrofuran (THF) and 380 g. (2.67 mols) of boron fluoride etherate are then slowly added dropwise while stirring vigorously. The reaction proceeds in accordance with the equation:

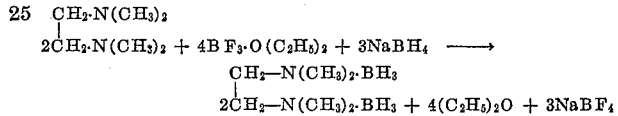

The internal temperature is kept between +10 and 30° C. by external cooling with iced water. Should the mixture become too viscous due to the separation of amine borane, it is diluted with tetrahydrofuran. After completing the main reaction, the mixture is stirred for another half an hour without cooling and is then slowly heated on a water bath until it boils under reflux. The mixture is boiled for 3 hours, filtered, and the filter cake extracted for several days with THF. The diamino borane of N,N,N′,N′-tetramethylethylene diamine is recovered in analytically pure form and in a quantitative conversion by driving off the THF from the combined filtrate and filter cake extract.

Example 3

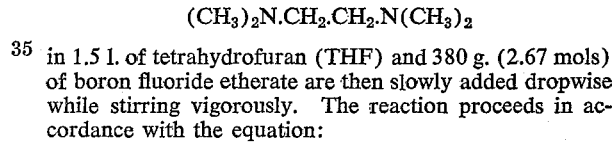

640 grams of boron trifluoride tetrahydrofuranate are added dropwise to a mixture of 330 grams of pyridine, 130 grams of sodium borohydride in 2000 ml. dry tetrahydrofuran with cooling at temperatures up to about 40° C. The mixture is subsequently boiled under reflux for 3 hours, cooled and then filtered. The distillation residue is purified by washing with water, drying and distillation in vacuum. The reaction product is pure pyridine borane which is obtained in a yield of more than 90 percent.

Example 4

$4(C_2H_5)_3N + BF_3.OC_4H_8 + 3LiBH_4 \rightarrow$
$4(C_2H_5)_3N.BH_3 + 3LiF + C_4H_8O$ 140 grams of boron fluoride tetrahydrofuranate is added dropwise to a solution of 420 grams of triethylamine and 70 grams of lithium borohydride in 3000 ml. of tetrahydrofurane while cooling with water. The mixture is then boiled under reflux for 4 hours and the major amount of the solvent is then distilled off. The residue is filtered and the filtrate fractionally distilled. N-triethylamine borane B.P. 98.6–102° C. (under 11 mm. Hg) is obtained in an almost quantitative yield.

We claim:

1. A process for preparing amine boranes which comprises reacting a nitrogen-containing compound selected from the group consisting of primary, secondary, tertiary lower alkyl monoamines and lower alkylene diamines, dimethylcyclohexylamine, aniline, N-methylaniline, N,N-dimethylaniline, piperidine, and pyridine with a member selected from the group consisting of alkali metal and alkaline earth metal borohydrides and a boron compound selected from the group consisting of boron trihalide, addition compounds of boron trihalide with a lower alkyl ether, and addition compounds of boron trihalide with tetrahydrofuran, and recovering the amine borane thereby formed.

2. Process as claimed in claim 1, wherein said nitrogen compound is dimethylamine.

3. Process as claimed in claim 1, wherein said nitrogen compound is trimethylamine.

4. Process as claimed in claim 1, wherein said nitrogen compound is triethylamine.

5. Process as claimed in claim 1, wherein said nitrogen compound is pyridine.

6. Process as claimed in claim 1, wherein said nitrogen compound is N,N,N',N'-tetramethyl-ethylene diamine.

7. Process as claimed in claim 1, wherein said boron compound is boron trifluoride.

8. Process as claimed in claim 7, wherein said boron compound is boron trifluoride diethyl etherate.

9. Process as claimed in claim 7, wherein said boron compound is boron trifluoride.

10. Process as claimed in claim 1, wherein tetrahydrofurane is used as a solvent.

References Cited in the file of this patent

UNITED STATES PATENTS 2,678,949    Banus et al.        May 18, 1954
2,898,379    Chamberlain et al.    Aug. 4, 1959

OTHER REFERENCES

Shore et al.: J. Am. Chem. Soc., vol. 77, pages 6084–5 (1955).

Taylor et al.: J. Am. Chem. Soc., vol. 77, pages 1506–7 (1955).

Koster: Chem. Absts., vol. 51, column 12717 (1957).